(12) United States Patent
Reetz et al.

(10) Patent No.: US 6,187,184 B1
(45) Date of Patent: Feb. 13, 2001

(54) TRAVELING WATER SCREEN HAVING IMPROVED BASKET

(75) Inventors: Wesley A. Reetz, Houston; William J. Hartson, Stafford, both of TX (US); Steven L. Barfuss, River Heights, UT (US)

(73) Assignee: Niagara Mohawk Power Corporation, Syracuse, NY (US)

( * ) Notice: Under 35 U.S.C. 154(b), the term of this patent shall be extended for 0 days.

(21) Appl. No.: 09/364,387

(22) Filed: Jul. 30, 1999

(51) Int. Cl.[7] .................................................. B01D 33/333
(52) U.S. Cl. ........................ 210/155; 210/160; 210/330; 210/488; 405/82
(58) Field of Search ..................................... 210/155, 158, 210/160, 161, 330, 400, 488, 499, 359; 405/81, 82, 83

(56) References Cited

U.S. PATENT DOCUMENTS

| | | |
|---|---|---|
| 1,564,451 | 12/1925 | Schroeder . |
| 1,573,785 | 2/1926 | Albright . |
| 1,579,105 | 3/1926 | Green . |
| 1,903,627 | 4/1933 | Koch . |
| 2,071,670 | 2/1937 | Warner . |
| 2,804,209 | 8/1957 | Carlton et al. ........................ 210/158 |
| 3,802,565 | * 4/1974 | Hughes et al. ........................ 210/160 |
| 4,176,984 | 12/1979 | Sommers ............................... 210/154 |
| 4,199,453 | 4/1980 | McCawley et al. .................. 210/160 |
| 5,242,583 | * 9/1993 | Thomas ................................. 210/161 |
| 5,326,460 | 7/1994 | Cheesman et al. ................... 210/160 |
| 5,501,793 | 3/1996 | Cheesman et al. ................... 210/160 |

FOREIGN PATENT DOCUMENTS

2195563 * 4/1974 (FR) .

* cited by examiner

*Primary Examiner*—David A. Simmons
*Assistant Examiner*—Frank M. Lawrence
(74) *Attorney, Agent, or Firm*—Wall Marjama & Bilinski

(57) ABSTRACT

A basket for a traveling water screen which includes a top rail with a pair of spaced apart end members at opposite ends of the top rail which are joined to the top rail. A water screen extends between the end members and includes an upper edge portion supported by the top rail, and a lower edge portion opposite the upper edge portion, and opposite edges supported by the spaced apart end members. A lower channel rail extends between the spaced apart end members and supports the lower edge portion of the water screen with the lower channel rail defining an internal channel having a smooth arcuate inner surface. An insert in the form of an elongated member is positioned in the bottom, back downstream side of the channel and forms a quiescent condition in the bottom of said channel when the basket is exposed to a flowing water stream.

7 Claims, 5 Drawing Sheets

TRAVELING WATER SCREEN HAVING IMPROVED BASKET

BACKGROUND OF THE INVENTION

The present invention relates to a traveling water screen for screening and removing debris and fish from water, and more particularly to an improved basket for a traveling water screen which enhances fish survival.

Traveling water screens have been widely used in applications in which it is desired to screen debris and fish from large volumes of water such as a power plant which requires a large volume of cooling water. Water for this purpose is usually taken from a river or lake through an inlet water channel. Debris and fish enter the channel with the water flowing into channel and must be screened out of the water to prevent debris from clogging the condenser tubes and to prevent the fish from being killed by heat and impingement on the condenser tubes and other parts of the cooling system.

U.S. Pat. Nos. 5,242,583; 4,935,131; 4,582,601; 4,541,930; 4,360,426; 3,868,324 and 3,850,804 illustrate traveling water screens and are exemplary of the state of prior art relating to this field. As generally taught by this prior art, a traveling water screen typically includes an upstanding frame having a pair of spaced vertical support members. The support members are mounted adjacent the opposed sides of the water inlet channel, such that water flowing through the channel cannot flow around the sides of the water screen. As set forth more specifically in U.S. Pat. No. 5,501,793, the frame includes a boot portion adjacent the bottom of the channel and a head portion anchored in a horizontal shelf above the water in the channel. A foot shaft is supported for rotation at the boot portion. A head shaft is supported for rotation at the head portion of the frame, and a drive motor is connected to the head shaft. A pair of endless chains are positioned around sprockets mounted on the head and foot shafts. A plurality of screen baskets are mounted on the chains and arranged in a continuous train for movement with the chains about a circuitous vertical path defined around the head and foot shafts. Adjacent baskets are mounted in close edge-to-edge relationship, and small gaps are provided between the baskets to provide clearance for the baskets to travel around the head and foot shafts. On the upstream side of the frame, the train of baskets moves upwardly from the foot shaft toward the head shaft, thereby forming a substantially continuous upwardly moving screen on the upstream side of the frame. The gaps between adjacent baskets permit unscreened water to flow through the traveling water screen.

Each basket includes spaced apart upper and lower rail beams, a pair of spaced apart end plates at opposite ends of the rail beams, and a water screen extending between the end plates and the upper and lower rail beams. The lower rail beam can include an elongated, upwardly opening channel upstream of the water screen for recovering fish trapped against the screen. The fish are captured in the channel as the basket moves upwardly on the upstream side of the frame. When the basket moves around the head portion of the frame, the fish and water are discharged out of the channel and into a trough in the shelf for return to the river or lake away from the water intake channel. A portion of the recovered fish are killed or injured during captivity in the channel before being deposited into the return trough.

Most prior art basket designs inherently have a hydraulically violent or turbulent region inside the lower channel rail which contain the fish until they are eventually released from the traveling water screen. This violent or turbulent region leads to a high percentage of fatalities of all fish which are caught and handled by these prior art traveling water screens.

In an effort to overcome this prior art problem, and increase the recovery of live and uninjured fish, U.S. Pat. No. 5,501,793 provides a basket of specific geometry which creates a quiescent region in the lower channel rail of the basket.

The basket design of the '793 patent, although accomplishing its objective of creating a quiescent zone, does so at a relatively high cost because of the complex structural geometry of the bottom channel rail of the basket. In addition, because the channel rail is an integral part design of the basket of the '793 patent, the quiescent zone structure cannot be readily retrofitted on existing prior art baskets to provide the advantages of the quiescent zone.

SUMMARY OF THE INVENTION

It is therefore an object of the present invention to provide a basket for a traveling water screen which overcomes the problems of the prior art described above.

It is another object of the present invention to provide a basket for a traveling water screen which includes a quiescent zone for minimizing fish mortality.

It is a further object of the present invention to provide a basket for a traveling water screen which includes a quiescent zone which is formed by a simple unitized insert inside the lower channel rail which can be used for most conventional baskets.

It is yet another object of the present invention to provide a novel system for retrofitting an existing traveling water screen with a basket to form a quiescent zone for the safekeeping of fish and other marine life.

The present invention is directed to a traveling water screen which utilizes an improved basket which has a lower channel rail designed to create a quiescent area or zone for fish entrapped within a channel formed by the lower channel rail. The quiescent area is created by the insertion of an insert member or rod inside the lower channel rail which significantly reduces the water turbulence within the channel, and dramatically increases the fish survival rate. The lower channel rail must be of an acceptable geometry in order for the insert member to work. The general cross-section of the channel rail of the present invention is in the form of an inverted "C" which defines an upwardly open channel having a generally arcuate inner surface. In the preferred embodiment, the cross section of the insert member is in the form of a rod having a quadrilateral cross-section with the two exposed surfaces within the channel. The insert member is positioned in the bottom rear or backside corner of the lower channel rail of the basket. It is the presence of the insert which abates the turbulence within the channel which would otherwise be occurring.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
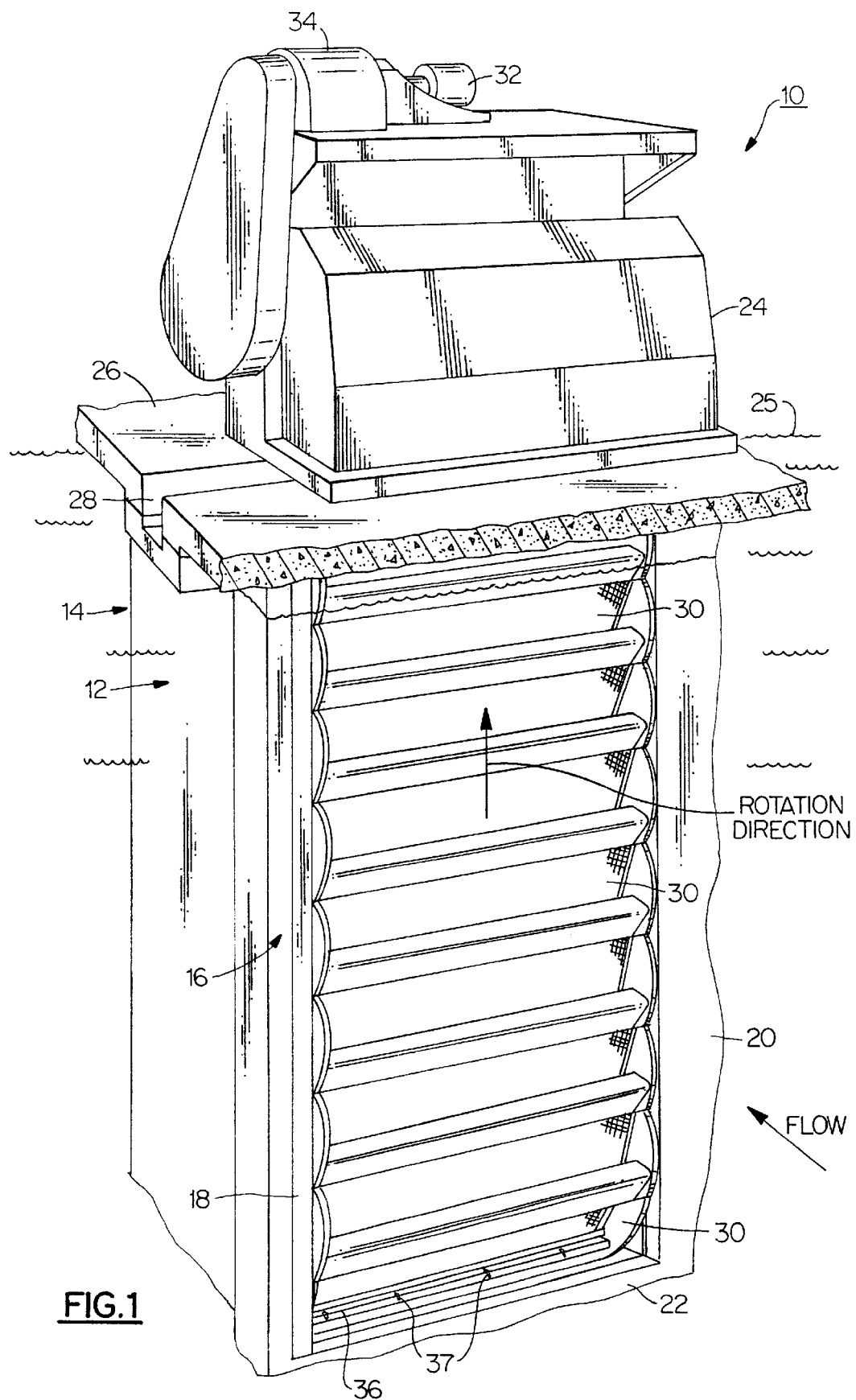
FIG. 1 is a perspective view of a conventional "Thru Flow" traveling water screen of the prior art retrofitted with insert means of the present invention for creating a quiescent zone in the basket.

FIG. 1 of the drawings illustrates a conventional prior art traveling water screen 10 for screening debris and fish from water flowing in a downstream direction through a water inlet.

The traveling water screen 10 includes an upright or vertical frame 12. The frame 12 has a downstream side 14 facing in the downstream direction and an opposed upstream side 16 facing in the upstream direction. The frame 12 includes a pair of spaced, parallel vertical support members 18 and 20. The frame 12 also has bottom support section 22 adjacent the bottom of the channel and a head portion 24 above the level of the water 25 in the channel. The flow of the water is illustrated by the arrow. The traveling water screen also includes a horizontally extending shelf 26 at the head portion 24 of the frame. The shelf 26 includes a fish return trough 28 extending away from the traveling water screen for returning fish to a body of water, such as a river or lake, away from the water inlet channel. The traveling water screen also includes a head shaft and foot shaft (not shown) supported at the head portion 24 and bottom section 22, respectively of the frame for rotation about a horizontal axis. A pair of head and foot sprockets (not shown) are mounted in a spaced relationship on the head and foot shafts. A pair of continuous chains (not shown) are trained around the head and foot sprockets (not shown). The traveling water screen also includes a plurality of baskets 30 fixed about a path defined by the chains connected to the head and foot shafts. The means for moving the train of baskets 30 includes a drive motor 32 operably connected to a gear reducer 34, the gear reducer 34 having a drive sprocket (not shown) mounted thereon. The drive sprocket is operably connected by a drive chain (not shown) to a driven sprocket (not shown) mounted on the head shaft. The drive motor 32 thus connected rotates the head shaft and thereby moves the chains and the train of baskets 30 about the circuitous path defined around the head and foot shafts. The baskets 30 move downwardly from the head shaft toward the foot shaft on the downstream side 14 of the frame 12. The bottom basket illustrated in FIG. 1 has been retrofitted and illustrates the improved basket of the present invention in that it contains an elongated insert 36 positioned in the bottom rear or backside corner of the lower rail which creates a quiescent zone for fish entrapped within the basket. The insert has been fixed in place by a plurality of screws 37.

The above description is specific to a "Thru Flow" traveling water screen. However, "Dual Flow" traveling water screens which are placed parallel to the channel flow (vs. perpendicular for "Thru Flows") also can utilize the same basket design as the "Thru Flow" screens and also fall within the scope of the present invention.

Figure 2:
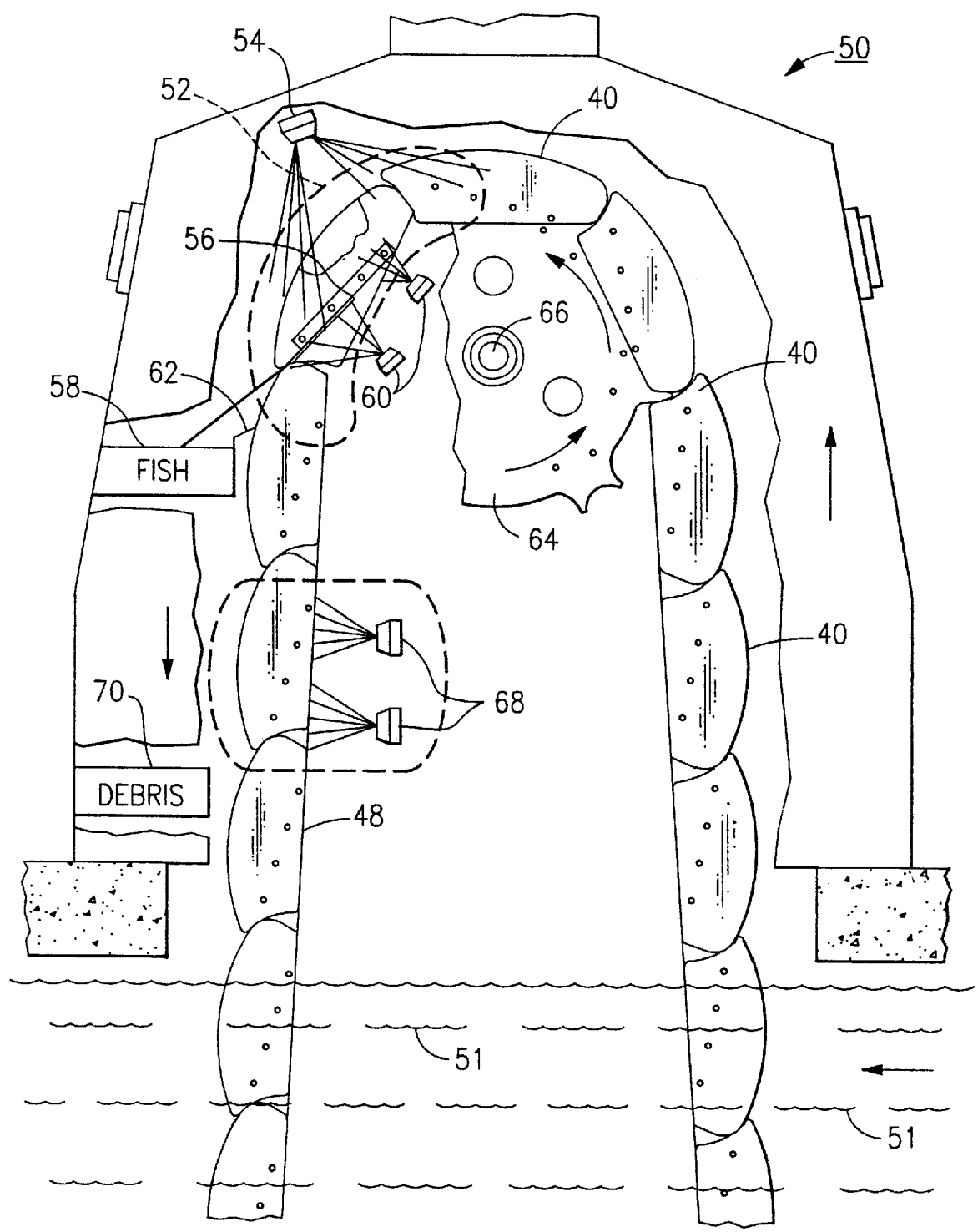
FIG. 2 is a partial side sectional view of the traveling water screen of the present invention.

The device of the present invention is further illustrated schematically in FIG. 2. which is a partial sectional schematic side view of a traveling water screen 50 which is illustrated in place in a water channel 51. In operation, raw water flows in the direction illustrated by the arrow through a mesh (48) contained on the back portion of a screen basket 40. Marine life is protected in the specially designed hydraulically stable fish screen basket 40 to be more specifically defined hereinafter. The screen baskets rotate in the direction shown by the arrows and are mounted on a pair of continuous chains (not shown) trained around a pair of head sprockets 64 connected to head shaft 66 and foot sprockets (not shown). The means for moving the train of baskets is conventional as described above in FIG. 1. As a given screen basket reaches the marine life discharge position, area (52), low pressure outside sprays (54) sluice water into the fish bucket area. As the screen baskets continues to rotate, the captured marine life sluices down mesh (56) toward the fish trough 58. Two inside low pressure sprays (60) aid the sluicing of the marine life. The marine life then follows a natural arc with flap seal (62) preventing any marine life from bypassing the trough (58). The screen baskets continue their decent, and pass a high pressure wash (64) which dislodges the debris into debris trough (66). The screen baskets continue their decent into the raw water flow, clean of fish and debris, to complete another cycle.

Figure 3:
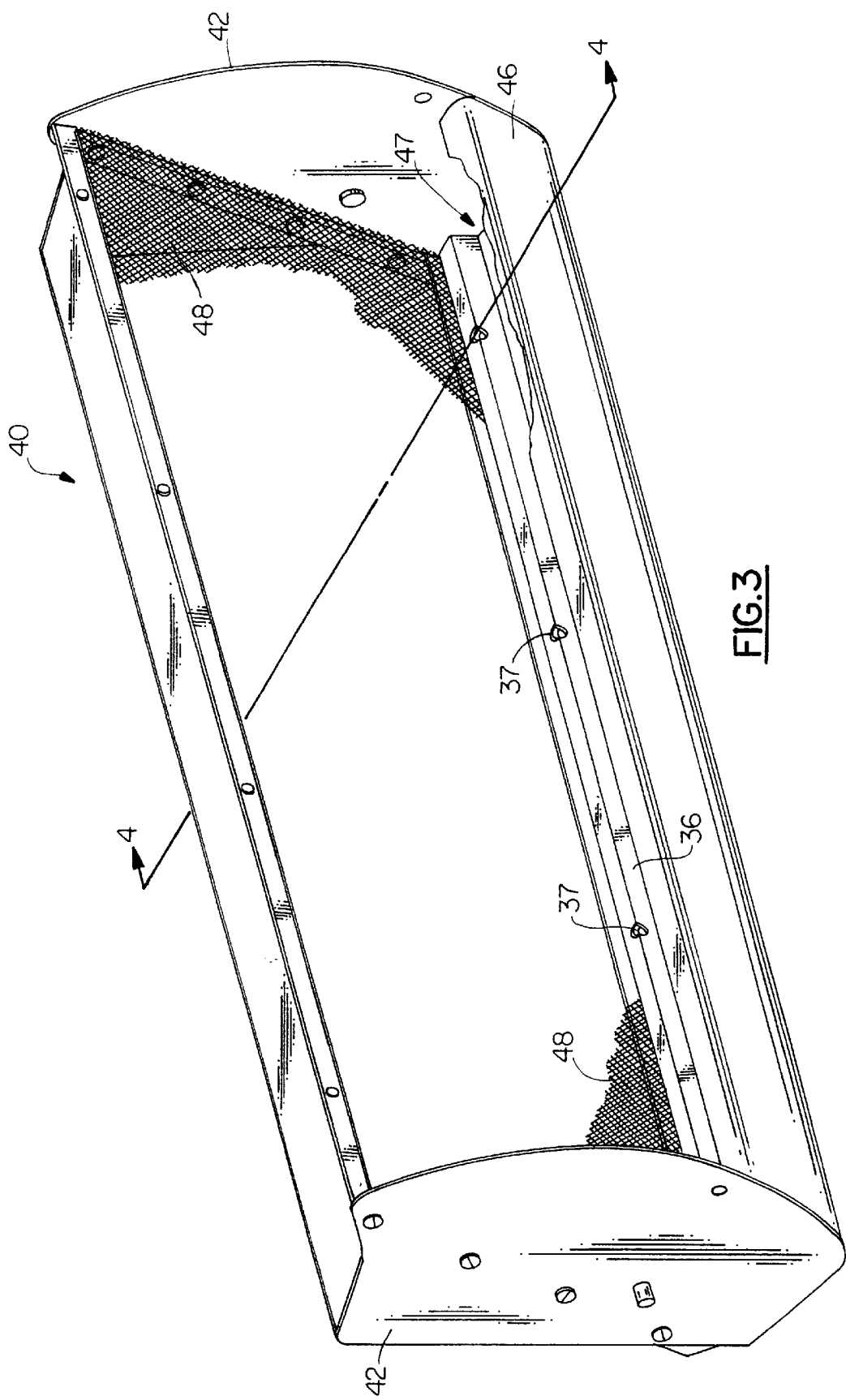
FIG. 3 is a perspective view of a basket for the traveling water screen of the present invention.
Figure 4:
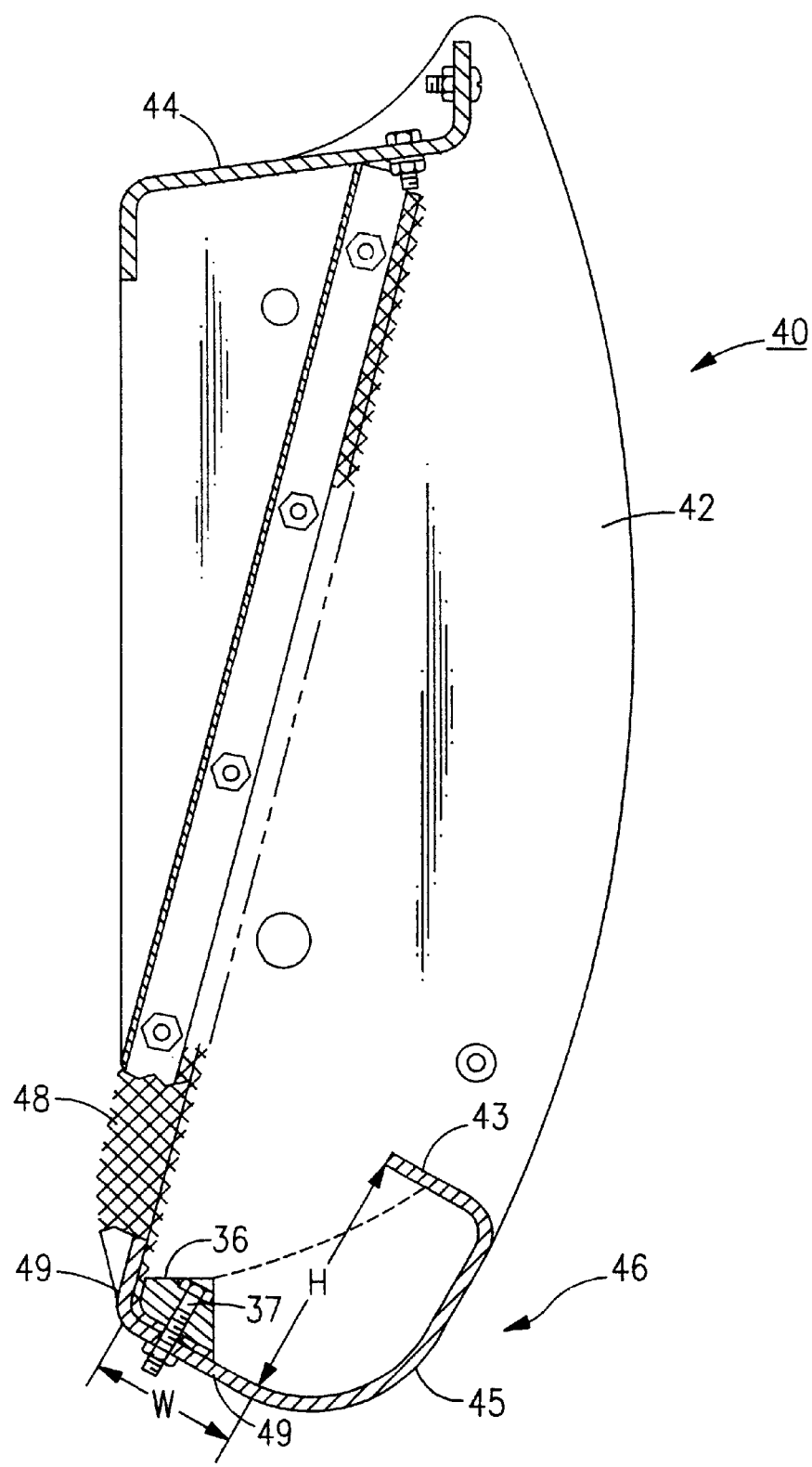
FIG. 4 is a side sectional view of the basket of FIG. 3 taken along line 4—4.
Figure 5:
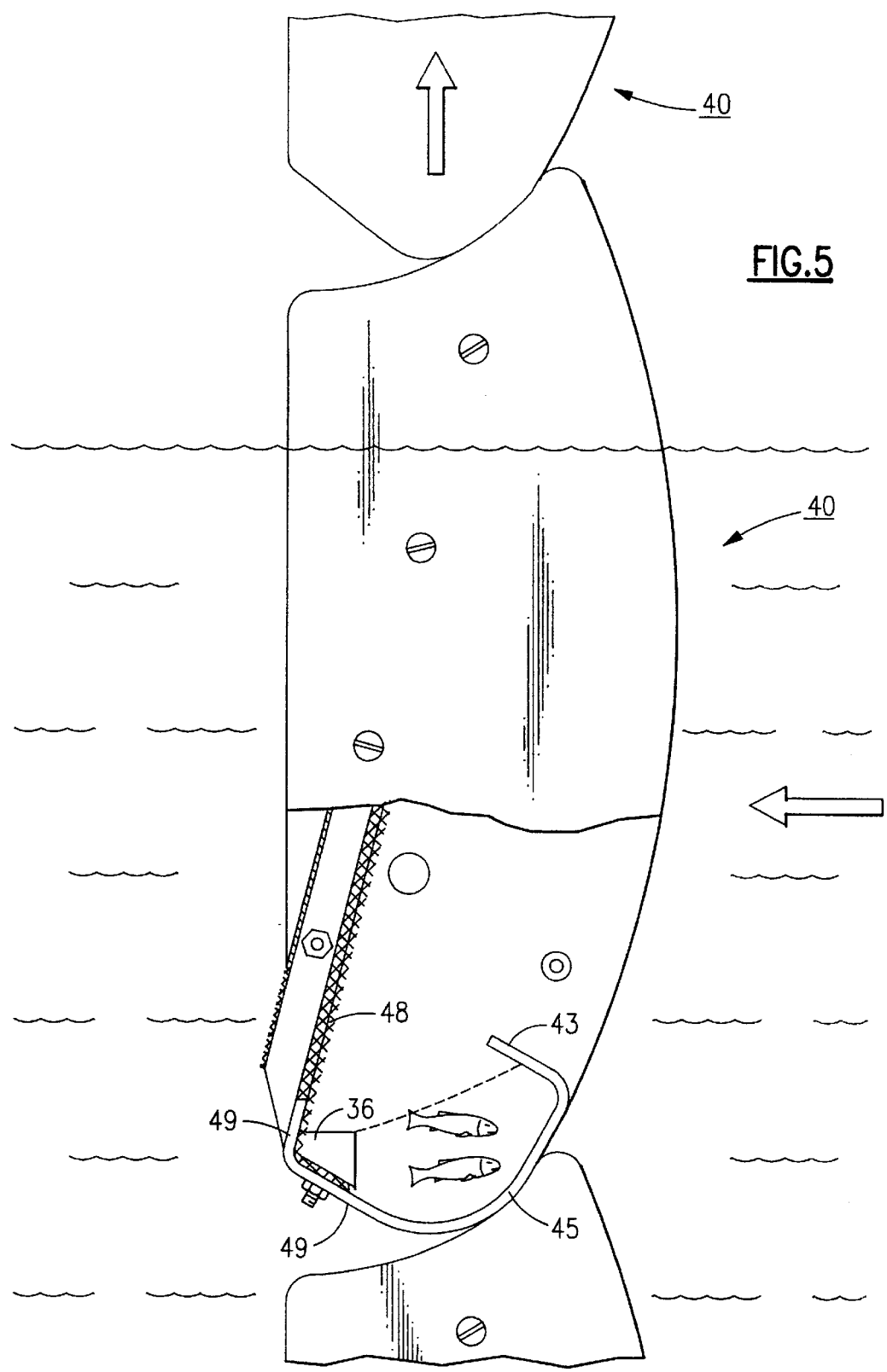
FIG. 5 is a side sectional view of a basket of the present invention with several fish positioned within the quiescent zone.

FIG. 3 is a perspective view of an improved screen basket 40 of the present invention which is defined by a pair of end plates 42, connected by a top rail 44 and bottom or lower 46 channel rail. A canted screen mesh 48 is connected to the top rail, lower rail and end plates respectively by screws as illustrated in the drawing. The inside of the lower channel rail defines an upwardly open channel 47 which is formed by the unitized or one piece lower channel rail 46 roughly having a general cross-section of an inverted "C". The channel comprises an upper diverter lip 43, an upstream curvilinear face 45 and a bottom rear section 49. An elongated full length insert 36 is positioned in the back of the bottom rear section of the lower channel rail. The insert may also be referred to as a "step clamp" and functions to lift the rotational eddy inside the channel rail above the top of the channel rail. The step clamp 36 also functions to secure the screen 48, through screws 37, to the lower channel rail 46 as shown in FIGS. 3, 4 and 5. The insert may be made of any suitable material such as metal or plastic.

As a result of the placement of the step clamp, a quiescent zone now occurs inside the interior of the channel rail which is defined as that area below the dotted line illustrated in FIGS. 4 and 5. In FIG. 5, the quiescent zone is shown with several fish swimming within the zone in a relatively calm and undisturbed manner. The flow direction of the water is illustrated by the arrow.

The insert 36 may be of any suitable size. The only requirement is that it be large enough to create the quiescent zone, and small enough to allow fish to be captured within the channel and easily released. The elongated insert, or step clamp, in one embodiment constitutes a continuous quadrilateral with the two exposed surfaces (i.e. a top and vertical face) having a specific width and height of about 1.4" when the dimension H is about 5.3" and the dimension W is about 3" as illustrated in FIG. 4 of the drawings. The insert 36 covers the full length of the basket and may also be made up of a plurality of segments or sections. One surface is basically horizontal and the other vertical when the basket is in an upright position as illustrated in FIGS. 4 and 5. In a preferred embodiment, the two exposed surfaces join to form an angle of about 90°. The step clamp can be retrofitted to existing baskets and is equally effective in baskets of any length. The hydraulic step clamp will work with bottom rails of similar geometries and size having a downstream extension of the upper lip (to direct flow upwardly and away from the quiescent area) and an inverted roughly C-shaped configuration to shelter the fish from the current. This basket structure is clearly illustrated in FIGS. 3, 4 and 5.

As described above, the elongated insert, or step clamp, is strategically positioned in the rear or back inside corner or bottom rear section of the lower channel rail as shown more clearly in FIGS. 3, 4 and 5. This placement disrupts the rotational eddy that would normally occur inside the channel, as well as functioning to effectively secure the screen mesh to the lower rail.

Results obtained by independent biological testing indicate that fish survival rates for traveling water screens incorporating the hydraulic step clamp of the present invention significantly improves fish survival rates compared to screens without such a member.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A traveling water screen for screening water flowing through said water screen in a downstream direction, comprising
    a vertical frame,
    a plurality of baskets attached to said frame for vertical movement about a circuitous path,
    each of the baskets including
        a top rail,
        a pair of spaced apart end members at opposite ends of said top rail and joined to said top rail,
        a water screen extending between the end members and having an upper edge portion supported by said top rail, a lower edge portion opposite the upper edge portion, with said opposite edges supported by said spaced apart end members, and
        a lower channel rail extending between said spaced apart end members and supporting the lower edge portion of said water screen, said lower channel rail defining an elongated upwardly opening channel upstream of said water screen, said channel containing water having an upper region adjacent the opening and a bottom region below the upper region, said lower channel rail including an insert in the form of an elongated member positioned longitudinally in the bottom back of the inner surface of said channel which creates a substantially quiescent condition in the bottom region of the water in said channel.

2. A basket for a traveling water screen, the traveling water screen being operable for screening water flowing through the traveling water screen in a downstream direction, said basket comprising
    a top rail,
    a pair of spaced apart end members at opposite ends of the top rail and joined to said top rail,
    a water screen extending between the end members and having an upper edge portion supported by the top rail, a lower edge portion opposite the upper edge portion, and opposite edges supported by the spaced apart end members, and
    a lower channel rail extending between the spaced apart end members and supporting the lower edge portion of the water screen, the lower channel rail defining an internal channel having a smooth arcuate inner surface, an insert in the form of an elongated member positioned in the bottom, back downstream side of said channel which forms a quiescent condition in the bottom of said channel when said basket is exposed to a flowing water stream.

3. The basket of claim 2 in which the elongated member is in the form of an insert which has two exposed surfaces which join to form an angle of about 90° or less.

4. The insert of claim 3 in which the cross-sectional geometry of said insert is roughly that of a quadrilateral.

5. The basket of claim 2 in which the cross sectional geometry of the lower channel rail is roughly that of an inverted "C".

6. A basket for a traveling water screen, the traveling water screen being operable for screening water flowing through the traveling water screen in a downstream direction, said basket comprising
    a top rail,
    a pair of spaced apart end members at opposite ends of the top rail and joined to said top rail,
    a water screen extending between the end members and having an upper edge portion supported by the top rail, a lower edge portion opposite the upper edge portion, and opposite edges supported by the spaced apart end members, and
    a lower channel rail extending between the spaced apart end members and supporting the lower edge portion of the water screen, the lower channel rail having a cross section defining an internal channel generally in the form of an inverted "C" having a smooth arcuate inner surface, an insert in the form of an elongated member having two exposed surfaces positioned in the bottom, back downstream side of said channel which forms a quiescent condition in the bottom of said channel when said basket is exposed to a flowing water stream.

7. The basket of claim 6 in which the two exposed surfaces of the insert join to form an angle of about 90° or less.

* * * * *